(12) United States Patent  
Urry

(10) Patent No.: US 6,381,746 B1  
(45) Date of Patent: Apr. 30, 2002

(54) SCALEABLE VIDEO SYSTEM HAVING SHARED CONTROL CIRCUITS FOR SENDING MULTIPLE VIDEO STREAMS TO RESPECTIVE SETS OF VIEWERS

(75) Inventor: Michael Robert Urry, Sandy, UT (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/318,987

(22) Filed: May 26, 1999

(51) Int. Cl.[7] .................................................. A61F 2/58
(52) U.S. Cl. ...................... 725/87; 725/92; 725/115; 725/138; 709/208; 709/231
(58) Field of Search ................ 725/87–88, 90–98, 725/114–116, 138; 709/208, 231

(56) References Cited

U.S. PATENT DOCUMENTS 5,583,561 A * 12/1996 Baker et al. ................... 348/7
5,668,948 A * 9/1997 Belknap et al. ......... 395/200.61
6,115,740 A * 9/2000 Mizutani ..................... 709/217

* cited by examiner

Primary Examiner—Andrew Faile
Assistant Examiner—Son P. Huynh
(74) Attorney, Agent, or Firm—Charles J. Fassbender; Mark T. Starr; Lise A. Rode

(57) ABSTRACT

A video system is comprised of: a) a single supervisor processor, and multiple co-processors which are selectable in number and are coupled via a bus to the single supervisor processor; b) a supervisor memory which is coupled to the supervisor processor and which stores a respective portion of each of several video streams; c) a control program in each co-processor which selectively reads the stored video stream portions from the supervisor memory and sends each video stream portion that is read to a different viewer; and d) a control program for the single supervisor processor, which dynamically updates the stored portion of each video stream in the supervisor memory and which services external requests to change the respective viewers of each video stream. In this video system, the number of co-processors is selectable; the number of video streams which are sent by each co-processor is selectable; and, the number of viewers per stream is selectable. Also in this video system, the cost of the supervisor processor and supervisor memory is incurred only once because they operate in a shared fashion with all of the co-processors.

19 Claims, 9 Drawing Sheets

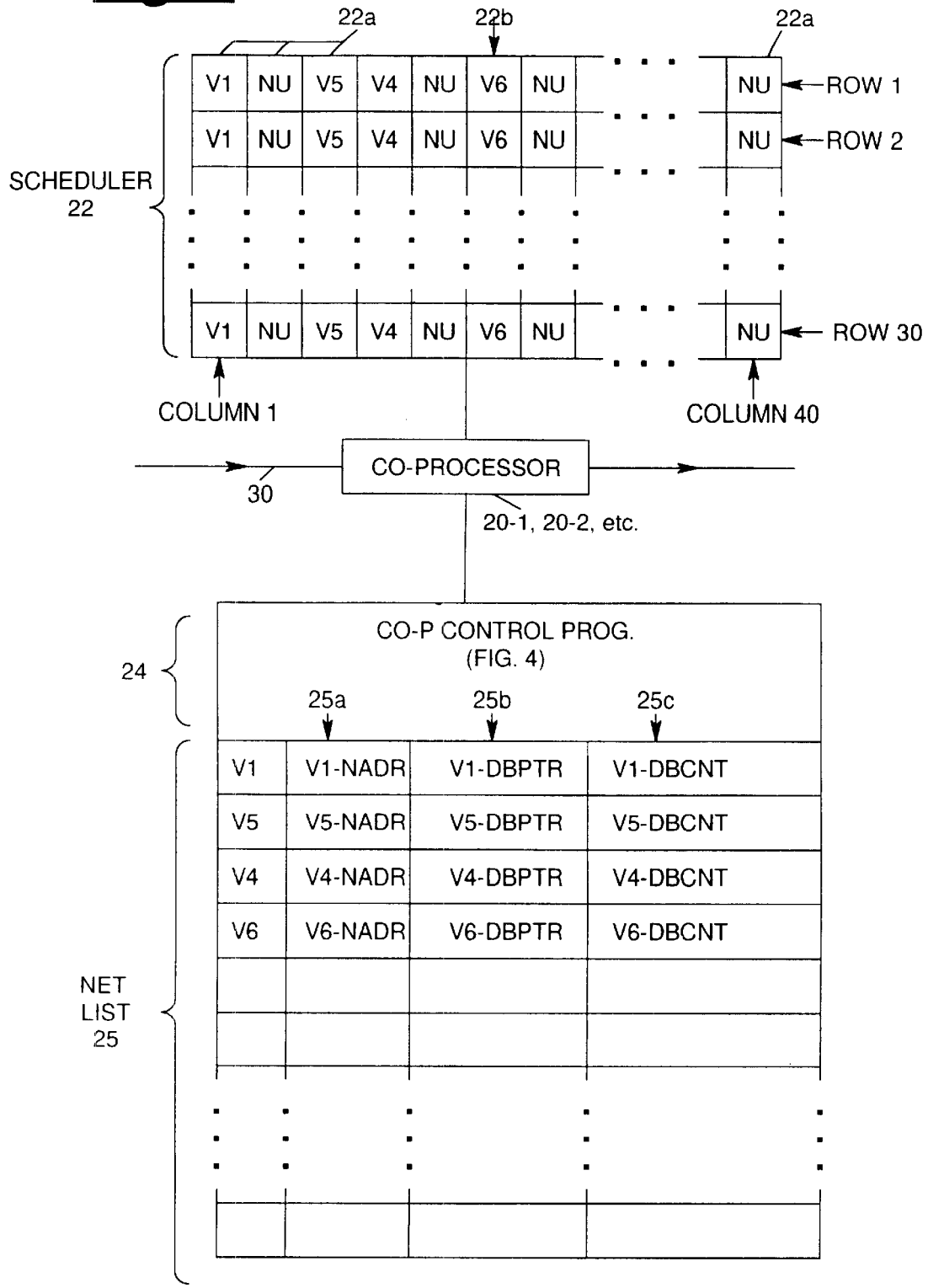

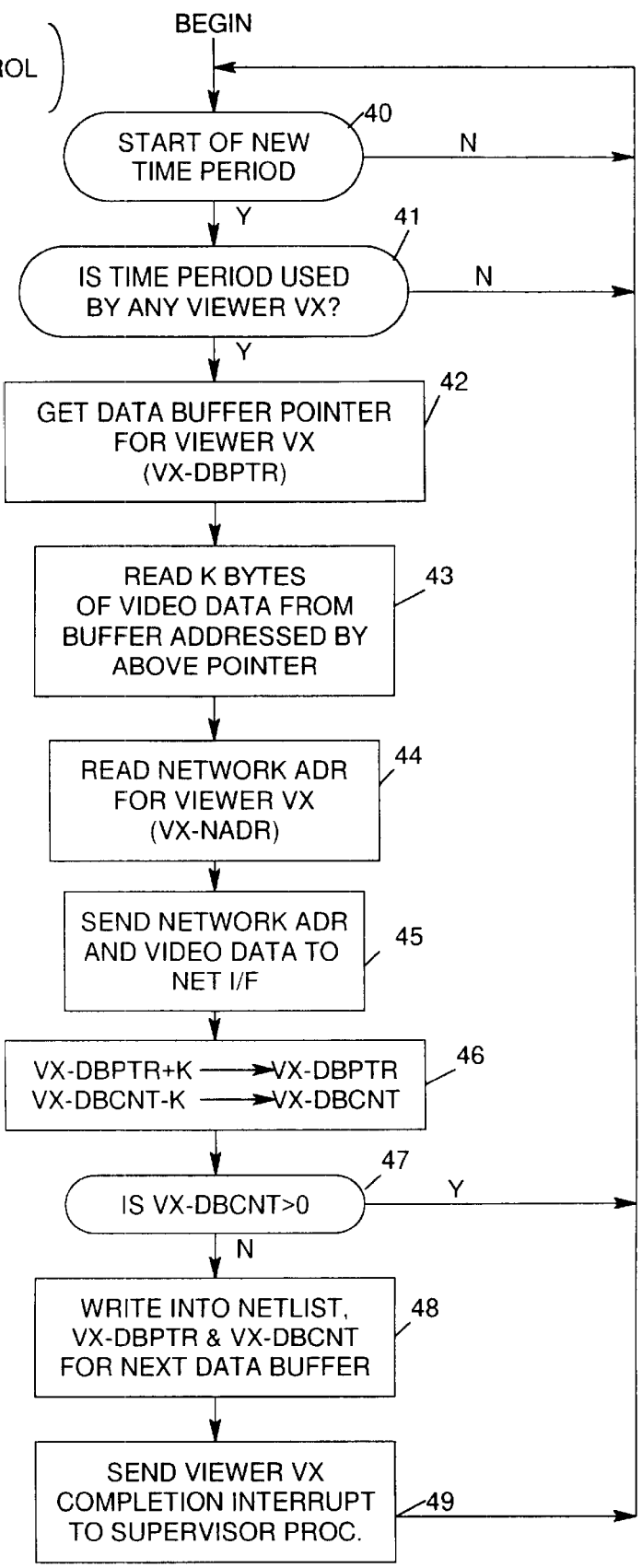

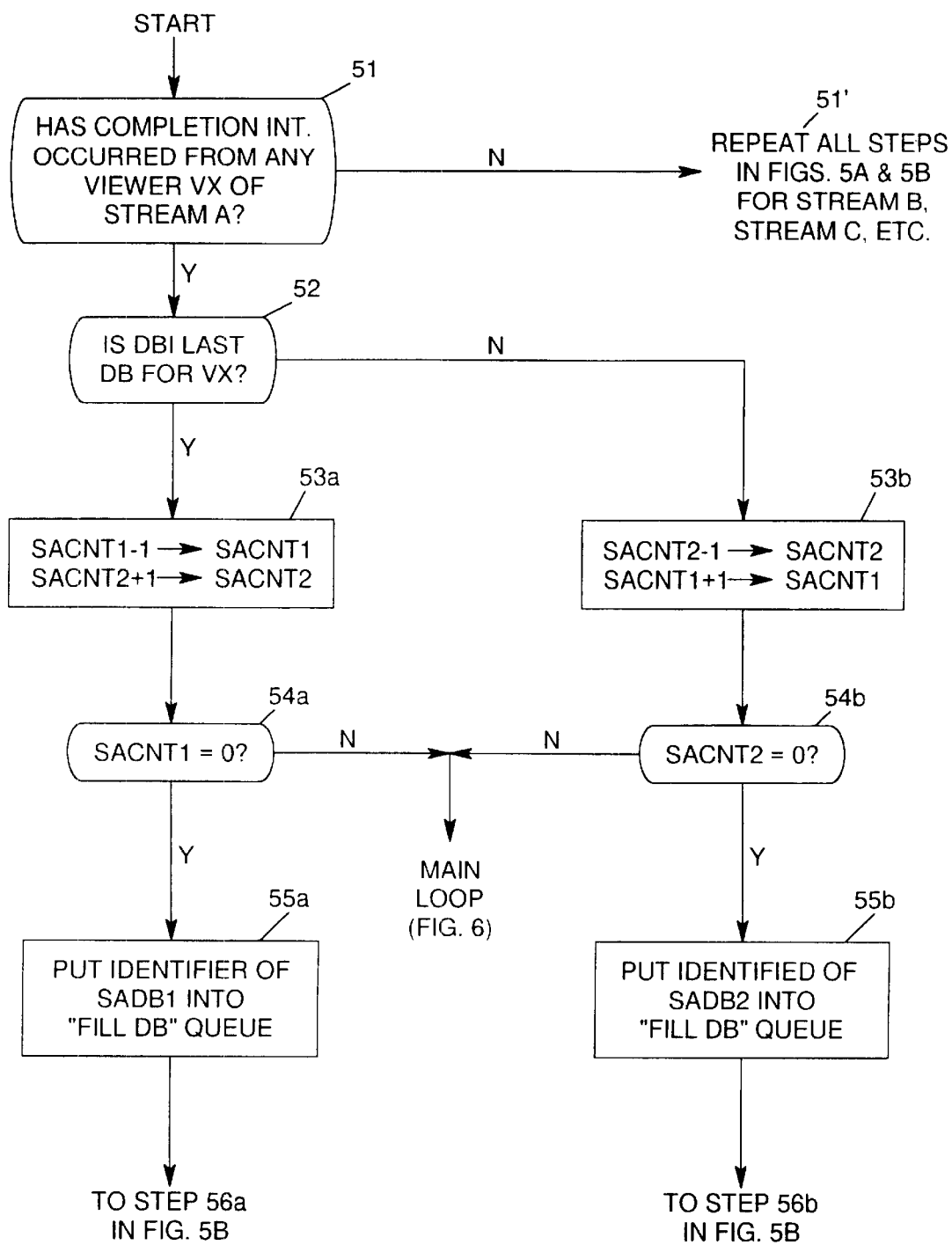
FIG. 5A (COMPLETION INT PROGRAM)

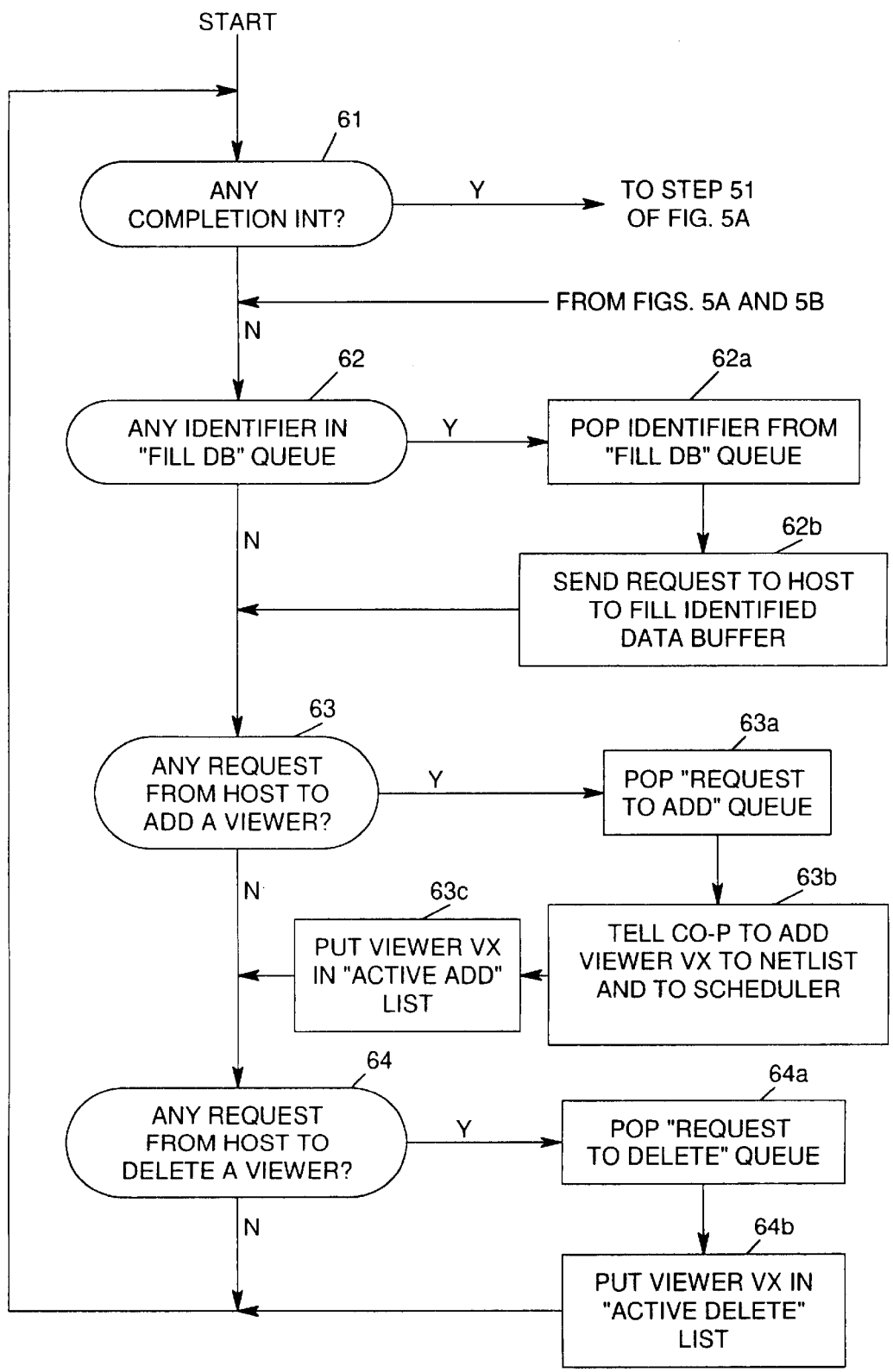
FIG. 6 (MAIN LOOP)

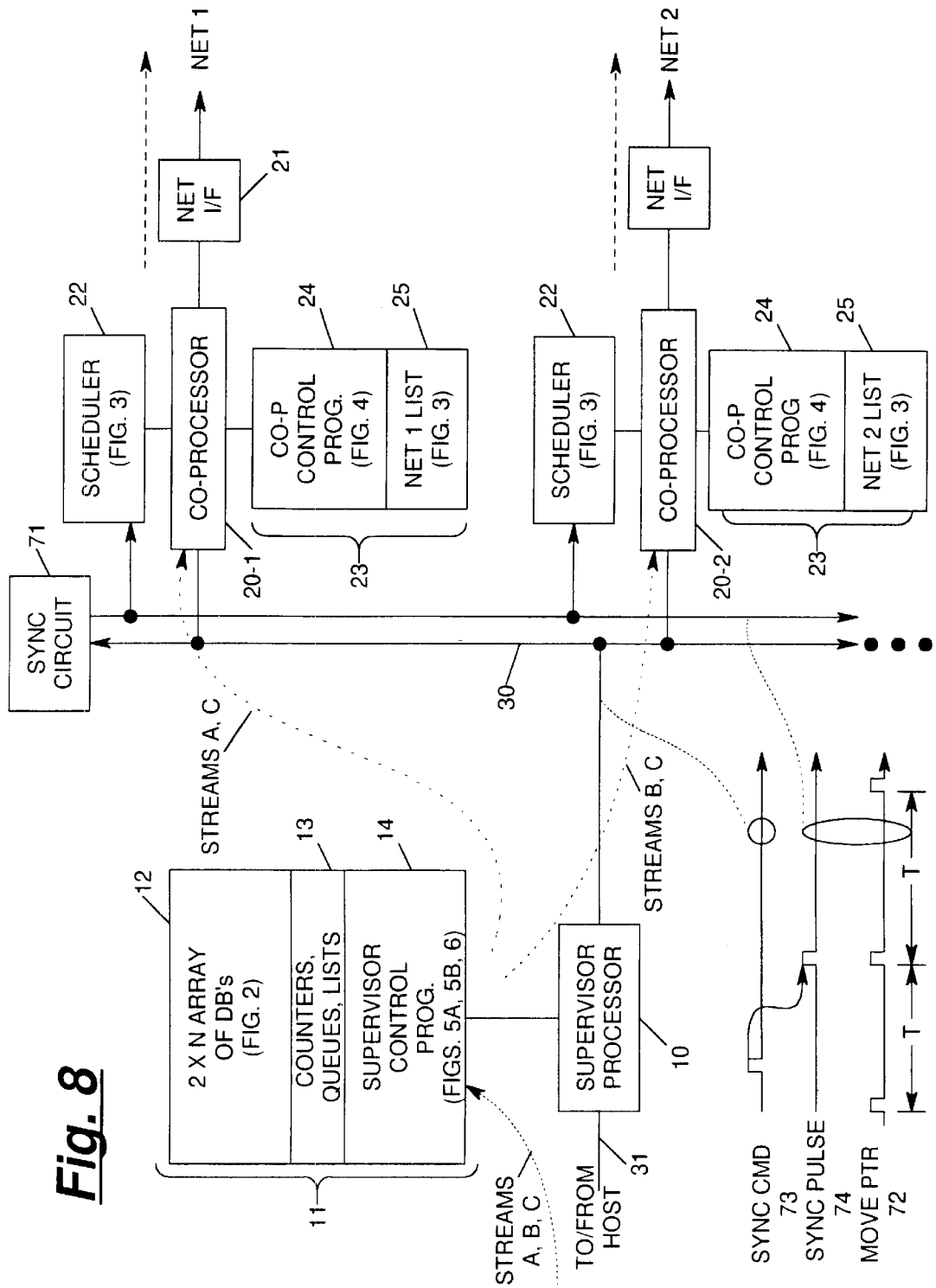

SCALEABLE VIDEO SYSTEM HAVING SHARED CONTROL CIRCUITS FOR SENDING MULTIPLE VIDEO STREAMS TO RESPECTIVE SETS OF VIEWERS

CROSS REFERENCE TO CO-PENDING APPLICATIONS

This application is related to commonly assigned co-pending U.S. patent application Ser. No. 09/304,908, filed May 4, 1999, and entitled "Video on Demand System"; U.S. patent application Ser. No. 09/304,906, filed May 4, 1999, and entitled "Video Server"; U.S. patent application Ser. No. 09/304,406, filed May 4, 1999, and entitled "Video on Demand Transaction Server"; and U.S. patent application Ser. No. 09/304,907, filed May 4, 1999, and entitled "A Web Based Video on Demand Administration Application".

BACKGROUND OF THE INVENTION

This invention relates to digital video systems which send multiple streams of video data from a video library to respective sets of viewers. In the prior art, one such system is described in U.S. Pat. No. 5,583,561 which is entitled "Multi-Cast Digital Video Server Using Synchronization Groups".

An overview of the above prior art system is shown in FIG. 1 of patent '561. There, multiple video programs are stored in a video library 10 which is coupled to a video server 12; and, the video server 12 is coupled through a network interface circuit 18 and a distribution network 20 to a plurality of addressable display devices 22, 24, and 26. To receive a particular video program at a particular display device, a request is sent by a viewer via a telephone to the video server.

A primary feature of patent '561 is that as the requests for the video programs are randomly received by he video server, they are partitioned into a redetermined number of synchronization groups. This is shown in FIGS. 5, 6A and 6B of patent '561. One synchronization group consists of the requests for a video program that are received between time T0 and T1; the next synchronization group consists of the requests for the same video program which are received between time T1 and T2; etc.

All of the viewers in a particular synchronization group are sent the requested video program starting at the same time; and each such transmission of the video program is called a "stream". In FIG. 5, the transmission of a video program which begins at time T0 is called STREAM #1; the transmission of the same program which begins at time T1 is called STREAM #2; etc.

By utilizing the synchronization groups and their respective streams, the total number of times which a video program must be transmitted from the video library 10 to the video server 12 is greatly reduced. Only one such transmission occurs for each synchronization group. By comparison without the synchronization groups, the video program must be transmitted from the video library each time a request for the program is received. Similarly, the synchronization groups reduce the total number of times which a video program must be transmitted from the video server 12 to the network interface circuit 18.

However, a drawback of the video system in patent '561 is that the network interface circuit 18 is comprised of an I/O processor 48, a multi-cast interface circuit 50, and an ATM interface 52; and, all three of those items must be replicated for each video stream that is sent concurrently with other video streams to the viewers. This is shown in FIGS. 2, 3, and 7.

For example, FIG. 2 shows the I/O processor 48 and the multi-cast circuit 50 and the ATM interface circuit 52 within the network interface 18. Further, FIG. 7 shows that each multi-cast interface circuit includes a single pair of frame buffers 90 and 92 which store portions of one video stream, a single pair of destination lists 94 and 98 which identify the viewers for the video stream that is in the frame buffers 90 and 92, and a control circuit 96. In operation, the control circuit 96 determines when and where the stored portion of the single video stream is sent from the frame buffers, and determines when the frame buffers need to be written with another portion of the video stream.

In FIG. 7 of patent'561, the control circuit 96 is simply shown as a labeled box. However, to actually control when and where the stored portion of the video stream is sent, and control when the frame buffers are updated, is a complex operation which by itself requires a substantial amount of circuitry to implement. Consequently, when all of the circuitry within items 48, 50, and 52 is duplicated for each video stream that is sent concurrently with others to the viewers, then the total cost of the resulting system can be too high to be competitive in the marketplace.

Accordingly, a primary object of the present invention is to provide an improved digital video system which avoids the above problem.

BRIEF SUMMARY OF THE INVENTION

In accordance with the present invention, a video system is comprised of the following components: a) a single supervisor processor, and multiple co-processors which are selectable in number and are coupled via a bus to the single supervisor processor; b) a supervisor memory which is coupled to the supervisor processor and which stores a respective portion of each of several video streams; c) a control program in each co-processor which selectively reads the stored video stream portions from the supervisor memory and sends each video stream portion that is read to a different viewer; and d) a control program for the single supervisor processor, which dynamically updates the stored portion of each video stream in the supervisor memory and which services external requests to change the respective viewers of each video stream.

One particular feature of the above video system is that it is highly scalable and economical. This feature is achieved because the number of co-processors is selectable; the number of video streams which are sent by each co-processor is selectable; and, the number of viewers per stream is selectable. By making these selections, the system can be increased or decreased in size to meet the different requirements of many customers. Further, since the system includes only a single supervisor processor and a single supervisor memory which operate in a shared fashion with all of the co-processors, the cost of those items is incurred only once.

With the above video system, each co-processor can send different video streams to respective lists of viewers; and in addition, a group of two or more co-processors can send the same video stream to respective lists of viewers. In one embodiment, the co-processors in the group run asynchronously, and the stored portion of that same video stream is duplicated for each co-processor in the group. In a second embodiment, the co-processors in the group run asynchronously, and a single portion of that same video stream is stored in three consecutive subparts which are shared by all of the co-processors in the group. In a third embodiment, a synchronizer circuit is provided for the co-processors, and a single portion of that same video stream is stored in two sub-parts which are shared by all of the co-processors in the group.

BRIEF DESCRIPTION OF THE DRAWINGS

FIG. 3 shows additional details of a scheduler circuit and a memory which are coupled to each of several co-processors within the FIG. 1 system.

FIG. 4 shows various steps which are performed by a control program for each co-processor within the FIG. 1 system.

FIGS. 5A and 5B show various steps which are performed by a completion interrupt portion of a control program for the supervisor processor within the FIG. 1 system.

FIG. 6 shows various steps which are performed by a main loop portion of the control program for the supervisor processor within the FIG. 1 system.

FIG. 8 shows a modification which is made to the system of FIG. 1 to thereby obtain a third embodiment of the present invention.

DETAILED DESCRIPTION

Figure 1:
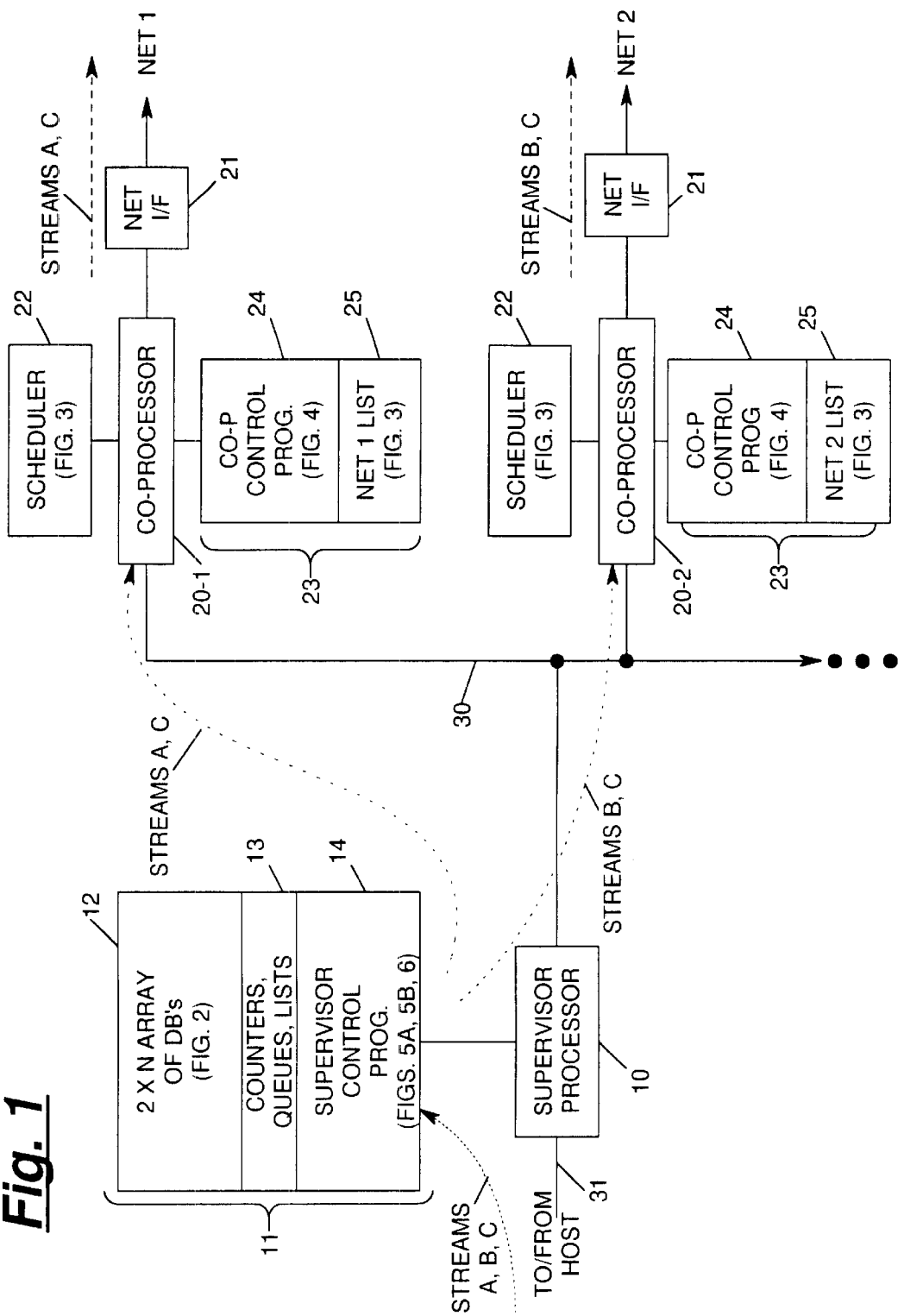
FIG. 1 shows an overview of a scaleable video system for sending several video streams to respective sets of viewers simultaneously, which constitutes one preferred embodiment of the present invention.

With reference now to FIGS. 1–6, a first preferred embodiment of the present invention will be described. Beginning with FIG. 1, it shows that this first embodiment includes a single supervisor processor 10 and a selectable number of co-processors 20-1, 20-2, etc., which are inter-coupled by a time-shared bus 30. In FIG. 1, only two co-processors are shown as an example.

Coupled to the supervisor processor 10 is a digital memory 11, and stored within that memory are several items 12, 13, and 14. Item 12 is a 2×N array of data buffers. Here, "N" is a variable which equals the sum of the number of video streams which each co-processor sends to respective sets of viewers. This 2×N array of data buffers is shown in detail in FIG. 2.

Figure 2:
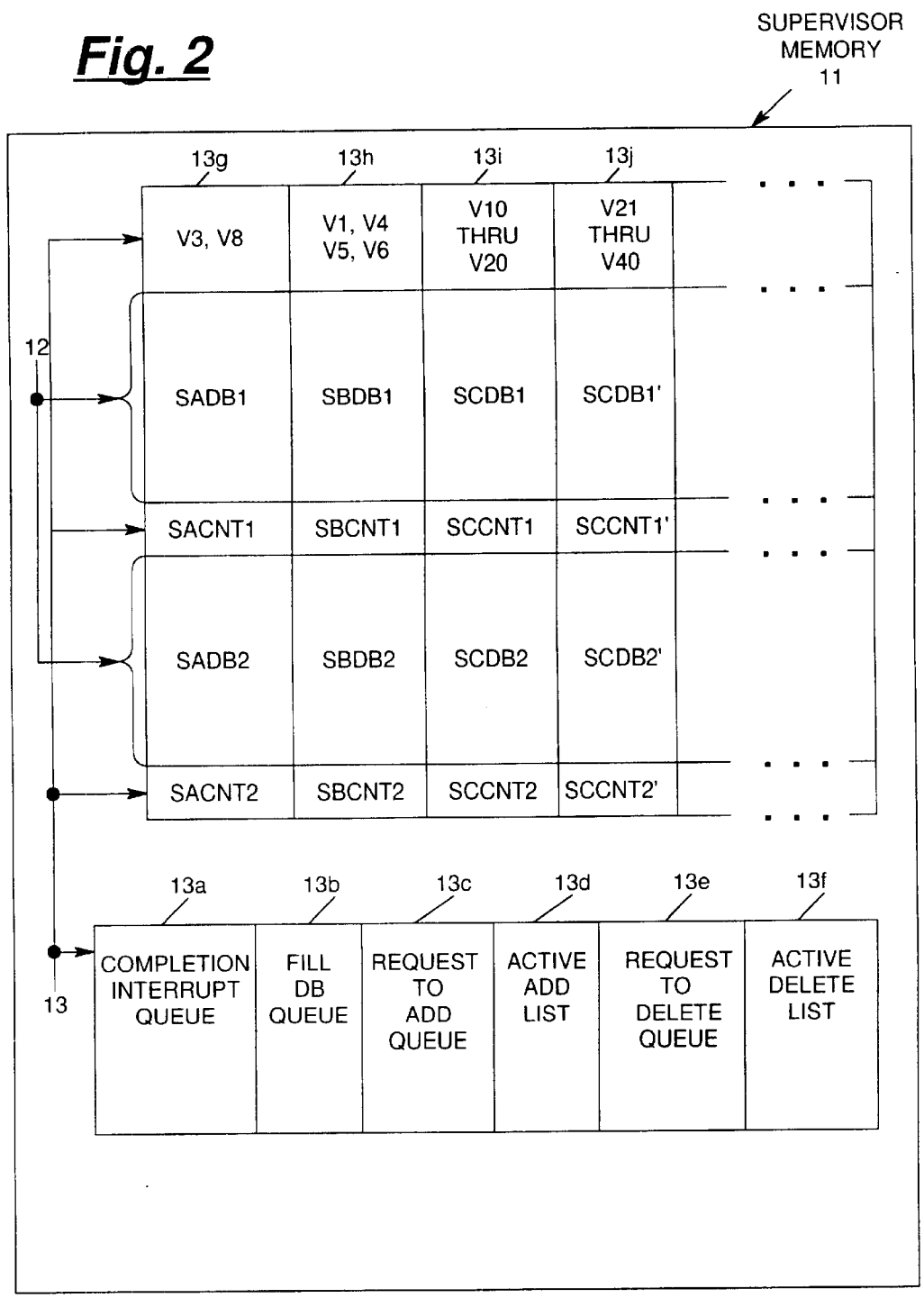
FIG. 2 shows additional details of a memory which is coupled to a single supervisor processor within the FIG. 1 system.

As one example in FIG. 1, the co-processor 20-1 sends video stream A and video stream C to respective sets of viewers; and, co-processor 20-2 sends video stream B and video stream C to respective sets of viewers. For that example, "N" equals two; and so the array of data buffers 12 in FIG. 2 is a 2×4 array.

Item 13 consists of several counters, queues and lists, which the supervisor processor 10 uses to perform various tasks. These counters, queues, and lists are shown in detail in FIG. 2; and they will be described shortly in conjunction with that figure.

One particular task for the supervisor processor 10 is to keep each pair of data buffers in the array 12 filled with two consecutive portions of a particular video stream. Another task for the supervisor processor 10 is to add viewers to the video streams, and delete viewers from the video streams. This is done in response to requests from a host computer (not shown) that is coupled to the supervisor processor via a host bus 31.

How the supervisor processor 10 actually performs its tasks is determined by item 14, which is a control program for the supervisor processor. That control program 14 is described in detail in conjunction with FIGS. 5A, 5B, and 6.

Coupled to each co-processor 20-1 and 20-2 is a network interface circuit 21, a scheduler circuit 22, and a digital memory 23. Through the network interface circuit 21, each co-processor is connected to a communications network which carries the video streams to the viewers. By the scheduler 22, each particular viewer is given certain time slots on the communication network during which its video stream can be sent.

Stored within the memory 23 are a co-processor control program 24 and a netlist 25. All of the viewers to which a particular co-processor sends video streams are identified in the netlist 25. Control program 24 interacts with the netlist and causes the co-processor to send forty-eight bytes of a video stream to a particular viewer during the time slot which is allotted by the scheduler circuit 22. All of the details of control program 24 are described herein in conjunction with FIG. 4.

Referring now to FIG. 2, additional details will be described on the structure of the data buffers 12, as well as the counters, queues, and lists 13, which are in the memory 11 of the supervisor processor. As FIG. 2 shows, a separate pair of data buffers is provided for each video stream that passes through a particular co-processor.

For example in FIG. 1, stream A passes through co-processor 20-1; and thus in FIG. 2, a pair of data buffers SADB1 and SADB2 is provided for stream A. Item 13 g in FIG. 2 shows that co-processor 20-1 sends stream A to two viewers V3 and V8. Similarly in FIG. 1, stream B passes through co-processor 20-2; and thus in FIG. 2, a pair of data buffers SBDB1 and SBDB2 is provided for stream B. Item 13h in FIG. 2 shows that co-processor 20-2 sends stream B to four viewers V1, V4, V5, and V6.

By comparison in FIG. 1, stream C passes through co-processor 20-1 and co-processor 20-2. Thus in FIG. 2, one pair of data buffers SCDB1 and SCDB2 is provided for co-processor 20-1, while another pair of data buffers SCDB1' and SCDB2' is provided for co-processor 20-2. Item 13i shows that co-processor 20-1 sends stream C to eleven viewers V10–V20; and item 13j shows that co-processor 20-2 sends stream C to twenty viewers V21–V40.

Figure 5B:
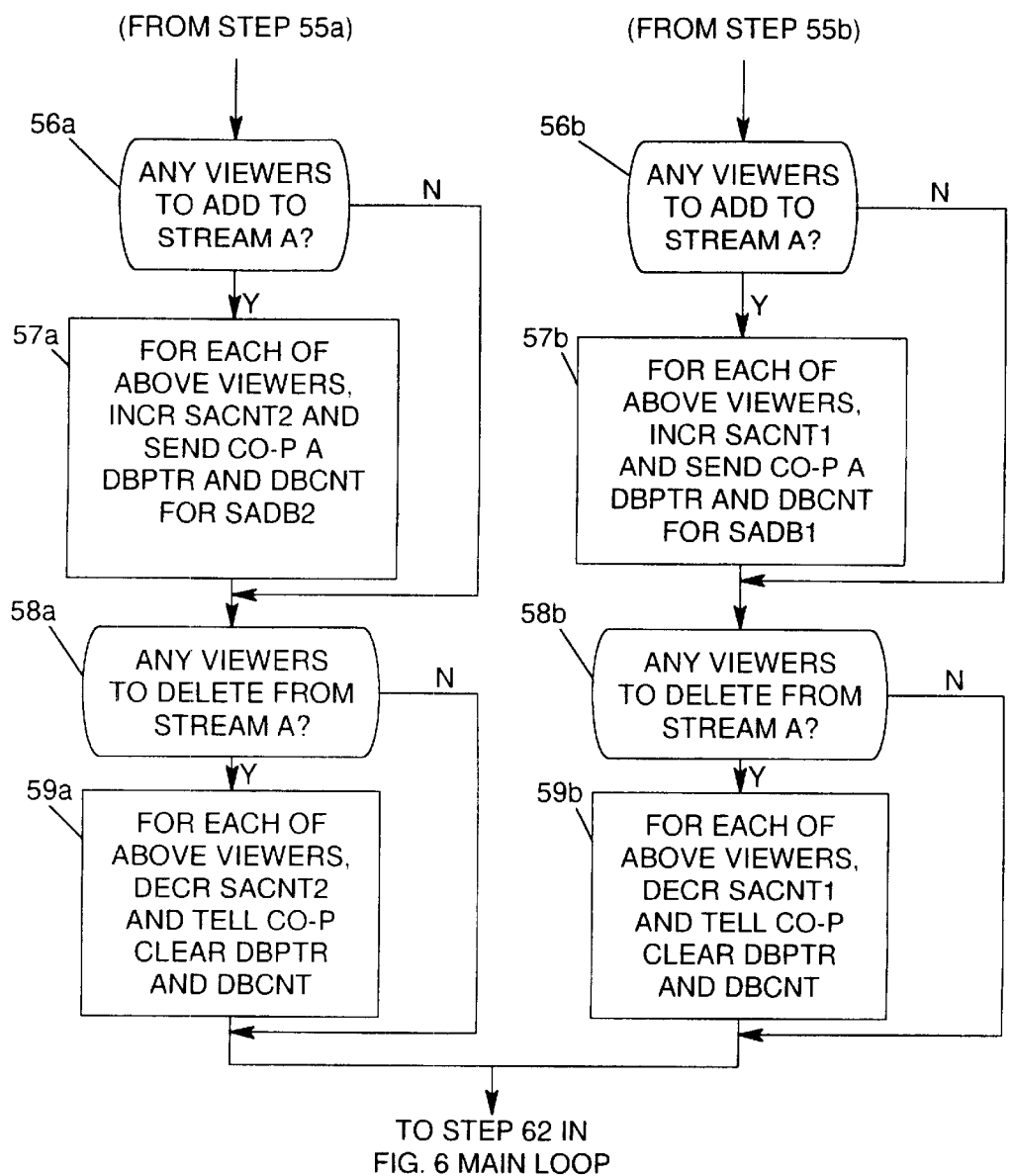

For each data buffer in FIG. 2, a separate counter is provided. Counter SACNT1 is for data buffer SADB1; counter SACNT2 is for data buffer SADB2; counter SBCNT1 is for data buffer SBDB1; etc. These counters are used by the part of the supervisor control program which is shown in FIGS. 5A and 5B.

Now, with reference to FIG. 3, additional details on the structure of the scheduler 22 and the netlist 25 for each co-processor will be described. This scheduler 22 is comprised of a plurality of cells 22a and a pointer 22b; and, the cells are sequentially scanned at a constant rate by the pointer. In FIG. 3, the cells 22a are arranged in thirty rows of forty cells per row, as an example. All of the FIG. 3 cells are scanned from left to right by the pointer 22b, one row at a time.

Each cell 22a selectively stores either the identity of a particular viewer in the netlist 25, or an indicator that the cell is not used. For example in FIG. 3, the left-most cell of each row identifies a viewer V1 in the netlist 25; the next cell in each row indicates that the cell is not used; the next cell in each row identifies a viewer V5 in the netlist 25; etc.

When the pointer 22b points to a cell which identifies a particular viewer in the netlist 25, the co-processor uses the netlist 25 and the data buffers 12 of FIG. 2 to send a small packet of bytes in the video stream to the identifier viewer. Conversely, when the pointer 22b points to a cell in the scheduler 22 which is not used, the co-processor simply waits for the pointer to move to the next cell.

For each viewer that is identified in the netlist 22, three corresponding items 25a, 25b, and 25c are provided in the netlist 25. Item 25a is a network address for corresponding viewer; item 25b is a pointer to one of the data buffers 12 in FIG. 2 for the corresponding viewer; and item 25c is a data buffer counter for the corresponding viewer. For example in FIG. 3, the viewer V1 has a network address V1-NADR, a data buffer pointer V1-DBPTR, and a data buffer counter V1-DBCNT.

A flow chart which shows in detail how the scheduler 22, the netlist 25, and the data buffers 12 are used by each co-processor is illustrated in FIG. 4. All of the steps in the FIG. 4 flow chart are specified by the co-processor control program 24.

Before the FIG. 4 steps are performed, the data buffers 12 in FIG. 2 have been loaded with respective portions of the video streams for the viewers. Also before the FIG. 4 steps are performed, the counters 13 in FIG. 2 have been loaded with the respective total number of viewers for each video stream.

Initially in FIG. 4, each co-processor waits for the start of a new time period to be signaled by its scheduler 22, and this step is indicated by reference numeral 40. A new time period starts when the pointer 22b in the scheduler 22 moves from one cell 22a to the next cell.

Next in step 41, the co-processor determines whether or not the new time period is used by any particular viewer VX. If the new time period is not used, then a branch is taken back to step 40 where the co-processor waits for the start of the next time period. Otherwise, steps 42–45 are performed.

In step 42, the co-processor uses the netlist 25 to get the pointer 25b to the data buffer in FIG. 2, which is used by the viewer VX. Then, in step 43, the co-processor reads a packet of K bytes of video data from the FIG. 2 data buffer, which is addressed by the pointer 25b. Here, K can be a single fixed number or a variable, as desired.

In one embodiment, K is always forty-eight with one exception. That exception occurs when the last packet of K bytes is read from the addressed data buffer. This last packet will be less than forty-eight bytes if the data buffer does not store a multiple of forty-eight bytes. Thus K is the smaller of forty-eight or the count in the data buffer counter VX-DBCNT.

Next in step 44, the co-processor reads the network address 25a for viewer VX from the netlist 25. Then in step 45, the co-processor sends the network address 25a which it obtained in step 44, along with the K bytes of video data which it obtained in step 43, to the network interface circuit 21. Suitably, the network address precedes the video data as a header. Then the network interface circuit 21 sends the header and the video data to the addressed viewer VX on the communication network.

Next in step 46, the co-processor increments the data buffer pointer 25b for viewer VX by a count of K and stores the result back in the netlist 25. Then the co-processor decrements the data buffer counter 25c for viewer VX in the netlist 25 by a count of K.

Next in step 47, the co-processor tests the data buffer counter 25c to determine if it is larger than zero. A count larger than zero indicates that the viewer VX has not been sent all of the video data which is in the data buffer that was addressed in step 43. If the data buffer counter 25c is larger than zero, then a branch is taken back to step 40 where the co-processor waits for the scheduler 22 to signal the start of the next time period. Otherwise, steps 48 and 49 are performed.

In step 48, the co-processor writes into the netlist 25, the pointer 25b and the counter 25c for the data buffer which viewer VX will use next. For example, if stream C is being sent to viewer VX by co-processor 20-1 and the current pointer 25b points to the data buffer SCDB1, then in step 48 the pointer for data buffer SCDB2 is written into the netlist 25. Similarly, if the current pointer 25b for viewer VX points to data buffer SCDB2, then in step 48 the pointer for data buffer SCDB1 is written into netlist 25.

Next in step 49, the co-processor stores the identity of viewer VX in the COMPLETION INTERRUPT QUEUE 13a of FIG. 2. This indicates to the supervisor processor that viewer VX has been sent the entire portion of the video stream which is in one of the data buffers. Then, a branch is taken by the co-processor back to step 40 to wait for the start of the next time period.

How a completion interrupt is serviced by the supervisor processor 10 is shown in detail by a flow chart in FIGS. 5A and 5B. Such an interrupt is caused by one or more viewers being identified in the COMPLETION INTERRUPT QUEUE. All of the steps in the flow chart of FIGS. 5A and 5B are specified by a portion of the supervisor control program 14.

Initially in FIG. 5A, step 51 is performed wherein the supervisor processor 10 removes one viewer VX from the COMPLETION INTERRUPT QUEUE 13a and checks to see if that viewer VX is being sent stream A. If that-is the case, then the remaining steps 52, 53a–59a, and 53b–59b in FIGS. 5A and 5B are performed.

In step 52, a test is made to determine if SADB1 was the last data buffer which was used to send a portion of stream A to viewer VX. If the last data buffer was SADB1, then a branch is taken to step 53a; otherwise a branch is taken to step 53b.

In step 53a, the counter SACNT1 is decremented by one and the counter SACNT2 is incremented by one. By decrementing the counter SACNT1, that counter indicates the total number of viewers for stream A who have not been sent the entire portion of stream A which is in data buffer SADB1. Conversely, by incrementing counter SACNT2, that counter indicates the total number of viewers who have been sent the entire portion of stream A which is in data buffer SADB1 and who need to be sent the next consecutive portion of stream A which now is in data buffer SADB2.

Next in step 54a, the counter SACNT1 is tested for a count of zero. If that count is not equal to zero, then the servicing of the completion interrupt terminates and a branch is taken to a "main loop" portion of the supervisor control program which is shown in FIG. 6. Otherwise, if counter SACNT1 equals zero, then steps 55a–59a are performed.

In step 55a, the supervisor processor 10 stores an identifier of the data buffer SADB1 into the FILL DB QUEUE 13b of FIG. 2. This identifier tells the supervisor processor 10 that it needs to send a message to the host computer to fill the data buffer SADB1 with the next consecutive portion of stream A. All of the entries in the FILL DB QUEUE 13b are processed by the supervisor processor 10 during its execution of the "main loop" portion of the control program in FIG. 6.

Following the above step 55a, the supervisor processor 10 performs step 56a wherein it checks to see if there are any new viewers to add to stream A. This check is made by examining an ACTIVE ADD LIST 13c which the supervisor processor 10 generates in the "main loop" portion of the control program in FIG. 6 and which is shown in FIG. 2.

For each new viewer who is to be added to stream A, step 57a is performed one time. There, the counter SACNT2 is incremented by one, and a pointer as well as a counter for data buffer SADB2 are written into the netlist of the co-processor which will send stream A to the added viewer.

Next, the supervisor processor 10 performs step 58a where it checks to see if there are any existing viewers to delete from stream A. To perform this step, the supervisor processor checks an ACTIVE DELETE LIST 13f which is generated during the execution of the "main loop" portion of the control program in FIG. 6 and which is shown in FIG. 2.

For each viewer who is to be deleted from stream A, step 59a is performed one time. There, the counter SACNT2 is decremented by one, and the co-processor which was sending stream A to the deleted viewer is sent a command to clear the data buffer pointer and data buffer counter for the deleted viewer. Then the servicing of the completion interrupt terminates and a branch is taken to the "main loop" portion of the supervisor control program which is shown in FIG. 6.

Referring now back to step 52 of FIG. 5A, consider the case where the last portion of stream A which was sent to viewer VX came from data buffer SADB2. In that case, steps 53b–59b are performed instead of the above-described steps 53a–59a.

All of the steps 53b–59b are similar to steps 53a–59a; the only differences are: a) counter SACNT1 is replaced with counter SACNT2, and vice versa; and b) data buffer SADB1 is replaced with data buffer SADB2, and vice versa. For example, in step 53b, counter SACNT2 is decremented by one whereas in step 53a counter SACNT1 is decremented by one.

Thus, by performing step 53b, counter SACNT2 indicates the total number of viewers for stream A who have not been sent the entire portion of stream A which is in data buffer SADB2. Likewise, counter SACNT1 indicates the total number of viewers who have been sent the entire portion of stream A which is in data buffer SADB2 and who need to be sent the next consecutive portion of stream A which now is in data buffer SADB1. Similarly, by performing step 57b, new viewers are added to stream A; and by performing step 59b, existing viewers are selectively deleted from stream A.

Next suppose that in step 51 of FIG. 5A, the viewer VX who caused the completion interrupt is being sent a video stream other than stream A. Then additional steps are performed by the supervisor processor 10 to determine which particular video stream is being sent to that viewer. For each video stream, the steps of FIGS. 5A and 5B are repeated in a slightly modified fashion wherein the FIG. 2 data buffers and counters for the corresponding stream are used. This is indicated in FIG. 5A by reference numeral 51'.

Turning now to FIG. 6, all of the steps which the supervisor processor 10 performs in the "main loop" portion of its control program 14 will be described. In this main loop, the supervisor processor 10 repeatedly performs four steps 61, 62, 63, and 64. Each such step determines whether or not the supervisor processor 10 needs to perform a particular task.

In step 61, the supervisor processor 10 checks to see if there is any entry in the COMPLETION INTERRUPT QUEUE 13a. These entries are made by step 49 in FIG. 4 as was previously described. If any entry is in the COMPLETION INTERRUPT QUEUE 13a, then a branch is taken to step 51 of FIG. 5A where the completion interrupt is serviced. Then, after the completion interrupt has been serviced, a branch is taken to step 62 in FIG. 6.

In step 62, a test is made to determine if any identifier is in the FILL DB QUEUE 13b. These identifiers are put into the FILL DB QUEUE 13b by steps 55a and 55b of FIG. 5A as was described above. If an identifier is in the queue, then steps 62a and 62b are performed. In step 62a, one of the identifiers is taken out of the queue; and in step 62b, a request is sent to the host computer to fill the identified data buffer.

In step 63, a test is made to determine if the host computer has sent any request to add a viewer to a video stream. Those requests are sent asynchronously from the host computer to the supervisor computer where they are stored in a REQUEST TO ADD QUEUE 13c which is shown in FIG. 2. If any entry is in the REQUEST TO ADD QUEUE 13c, then steps 63a, 63b, and 63c are performed.

Step 63a removes an entry from the REQUEST TO ADD QUEUE. Then step 63b sends a message to one of the co-processors which tells the co-processor to add a viewer VX to its net list 25 and to its scheduler 22. Then step 63c puts the viewer VX into the ACTIVE ADD LIST 13d. That list 13d is subsequently used in steps 56a and 56b of FIG. 5B to actually start sending a video stream to the viewer VX, as was described above. Thus, by the above step 63b, the scheduler and netlist are set up well before the sending of the video stream to viewer VX begins.

Next in step 64, a test is made to determine whether or not any request has been received from the host computer to delete a viewer from a video stream. Those requests are asynchronously sent from the host computer to the supervisor computer where they are stored in the REQUEST TO DELETE QUEUE 13c of FIG. 2. If any entry is in the REQUEST TO DELETE QUEUE, then steps 64a and 64b are performed.

Step 64a removes an entry from the REQUEST TO DELETE QUEUE 13b; and step 64b puts the viewer VX who is to be deleted into the ACTIVE DELETE LIST 13f. All of the viewers on that list actually stop being sent their video stream when steps 58a, 59a, 58b, and 59b of FIG. 5B are performed, as was previously described.

One preferred embodiment of the present invention has now been described in detail. A particular feature of this embodiment is that it is highly scalable in that it has a selectable number of co-processors, a selectable number of video streams per co-processor, and a selectable number of viewers per stream in each co-processor. Thus the above-described embodiment can be scaled up or down in size to meet the different requirements of many customers. Also, the above-described embodiment includes only a single supervisor processor which is shared by all of the co-processors; and consequently, the cost to the supervisor processor is incurred only once.

Another feature of the above-described embodiment is that a group of two or more co-processors can send the same stream to respective lists of viewers, even when the schedulers 22 of all of the co-processors in the group run asynchronously to each other. For example in FIG. 1, stream C is sent by two co-processors 20-1 and 20-2 to respective lists of viewers. At any time instant while stream C is being sent, the pointer 22b in the scheduler 22 for co-processor 20-1 can be pointing to a particular cell in a particular row while the pointer 22b in the scheduler 22 for co-processor 20-2 can be pointing to a different cell in a different row. This asynchronous operation works without errors in the above-described embodiment because each co-processor has its own set of data buffers 12 and counters 13 for the streams that it sends.

Figure 7:
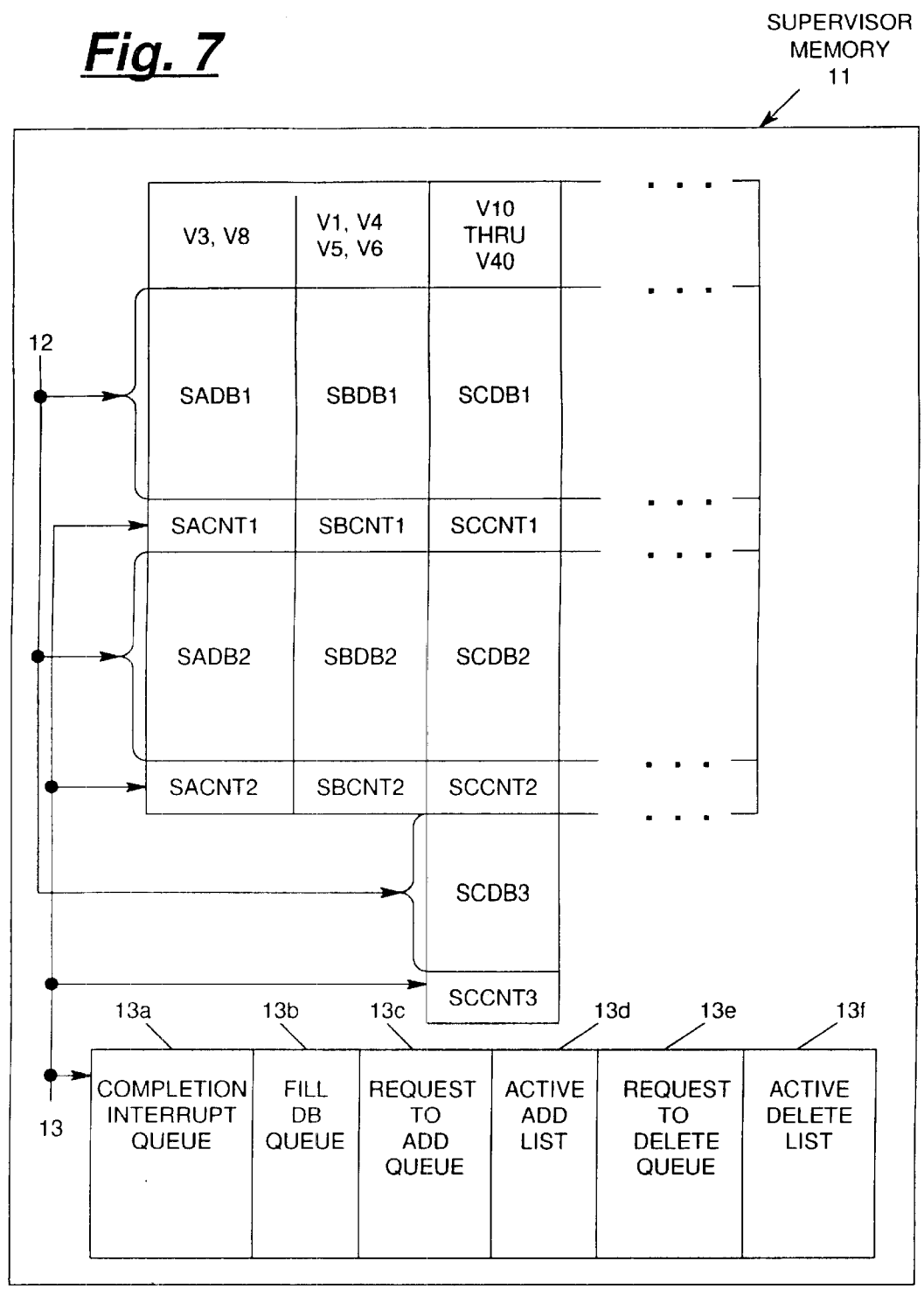
FIG. 7 shows a modification which is made to the supervisor processor memory of FIG. 2 to thereby obtain a second embodiment of the present invention.

Next, with reference to FIG. 7, a second preferred embodiment of the present invention will be described. This second embodiment of FIG. 7 differs from the first embodiment of FIGS. 1–6 in that the supervisor memory 11 includes a set of three data buffers SCDB1, SCDB2, and SCDB3 which store consecutive parts of stream C for all of the co-processors that send stream C to respective lists of viewers. For example, in the above-described case where co-processor 20-1 sends stream C to viewers V10 thru V20 and co-processor 20-2 sends stream C to viewers V21 thru V40, both of those co-processors 20-1 and 20-2 obtain stream C from the three data buffers SCDB1, SCDB2, and SCDB3.

Each of the three data buffers SDCB1, SCDB2, SCDB3 has a respective counter SCCNT1, SCCNT2, SCCNT3; and those counters determine the total number of viewers for the portion of stream C which is stored in the corresponding data buffer. This is achieved by incorporating a modification into the completion interrupt program of FIGS. 5A and 5B.

In the modified completion interrupt program, a series of steps, similar to steps 53a–59a, are performed for each of the data buffers SCDB1, SCDB2 and SCDB3 and their corresponding counters. When the step corresponding to step 53a is performed for data buffer SCDB1, counter SCCNT1 is decremented by 1, and counter SCCNT2 is incremented by 1. Similarly, when the step similar to step 53a is performed for data buffer SCDB2, counter SCCNT2 is decremented by 1, and counter SCCNT3 is incremented by 1. Likewise, when the step similar to step 53a is performed for data buffer SCDB3, counter SCCNT3 is decremented by 1, and counter SCCNT1 is incremented by 1. New viewers are added to stream C only when counter SCCNT1 is decremented to zero.

When counter SCCNT1 equals zero, a step similar to step 57a is performed wherein counter SCCNT3 is incremented by the number of viewers who are to be added to stream C. Counter SCCNT3 is incremented, rather than counter SCCNT2, because some of the present viewers of stream C may already be receiving the portion of the video stream which is in data buffer SCDB2 due to the asynchronous operation of the scheduler circuit 22, as was described above. By incrementing counter SCCNT3, rather than counter SCCNT2, new viewers are added to the part of the video stream which is in the data buffer SCDB3 only before the sending of that part to any current viewer has started.

Next, with reference to FIG. 8, a third preferred embodiment of the present invention will be described. This third embodiment of FIG. 8 differs from the first embodiment of FIGS. 1–6 in that it includes a synchronizer circuit 71 which is coupled to the bus 30 and to the scheduler circuit 22 of all of the co-processors.

In operation, the synchronizer circuit 71 continuously sends a series of MOVE POINTER PULSES 72 at a constant rate to every scheduler circuit 22. In response to each MOVE POINTER PULSE, every scheduler circuit 22 moves its pointer 22b from one cell 22a to the next cell. This operation continues until the supervisor processor sends a SYNC COMMAND 73 to the synchronizer circuit 71. Preferably, this SYNC COMMAND 73 is sent one time by the supervisor processor 10 when the system is just starting to operate.

In response to the SYNC COMMAND, the synchronizer circuit 71 sends a single SYNC PULSE 74 to each scheduler circuit 22 at the same time that it sends one MOVE POINTER PULSE 72. When the SYNC PULSE and the MOVE POINTER PULSE are received concurrently by all of the scheduler circuits 22, the pointer 22b in all of the scheduler circuits is moved to the left-most cell 22a of the top-most row. Thereafter, the MOVE POINTER PULSES 72 continue to be sent to every scheduler circuit without the sync pulse; and in response, the pointer 22b in each scheduler circuit moves from one cell to the next sequential cell.

Due to the above operation of the synchronizer circuit 71, the supervisor memory 11 of FIG. 2 is modified to include just a single pair of data buffers for each different stream of video data that is sent. This change is made regardless of how many different co-processors are sending the same video stream to respective lists of viewers. Thus in FIG. 2, the data buffers SCDB1' and SCDB2', as well as their respective counters, are eliminated.

Several preferred embodiments of the present invention have now been described in detail. In addition, however, various changes and modifications can be made to these embodiments without departing from the nature and spirit of the invention. For example, the size of each of the data buffers in FIGS. 2 and 7 can be chosen as desired. Suitably, each of those data buffers holds sixty-four kilobytes.

As another modification, each of the items which are shown in the figures can be implemented with a variety of different circuits. For example, the memories 11 and 23 can be implemented with various random access integrated circuit memory chips; and the supervisor processor 10, as well as each co-processor 20-1, 20-2, etc., can be implemented with various integrated circuit microprocessor chips. In one embodiment that was actually constructed, the supervisor processor 10 was an I960 microprocessor chip from Intel Corporation, and each co-processor together with its scheduler was a BT8233 integrated circuit chip from Rockwell Corporation.

As another modification, the supervisor processor 10 together with its co-processors 20-1, 20-2, etc., can be replicated and connected to via the host bus 31 a single host computer. Such replication could be done, for example, when the total number of all of the viewers is so large that the maximum data rate of a single bus 30 is exceeded.

Accordingly, it is to be understood that the invention is not limited to the details of the above-described preferred embodiments but is defined by the appended claims.

What is claimed is:

1. A scaleable video system of a type which includes a video library that stores multiple video programs, and a host computer coupled to said video library which assigns randomly received requests for viewing said video programs to a finite number of video streams; said scaleable video system being comprised of:

a separate supervisor processor which is coupled via a host bus to said host computer, and multiple co-processors which are selectable in number and are coupled via a co-processor bus to said supervisor processor;

said supervisor processor having a data storage means which stores a respective portion of several of said video streams;

each co-processor including a means for selectively reading said stored video stream portions from said data storage means and for sending each read portion to a different set of viewers; and, said single supervisor processor including a control means for dynamically updating the stored portion of each video stream in said data storage means and for servicing requests from said host computer to change the respective viewers of each video stream.

2. A scaleable video system according to claim 1 wherein a group of at least two of said co-processors send the same video stream to respective sets of viewers, and where for each co-processor in said group, the stored portion of said same video stream is duplicated in said data storage means.

3. A scaleable video system according to claim 2 wherein said control means divides each duplicate video stream portion into first and second consecutive sub-parts, and includes a separate counter for each sub-part which determines the total number of viewers for the corresponding sub-part.

4. A scaleable video system according to claim 3 wherein each time a viewer has been sent said first sub-part of one duplicated video stream portion in its entirety, said control means decrements the one counter for that first sub-part and increments the counter for the corresponding second sub-part.

5. A scaleable video system according to claim 4 wherein said control means asynchronously receives external requests to have said same video stream be sent to a number of new viewers; and where said control means satisfies said requests when said one counter is decremented to zero by adding said number to said counter for said corresponding second sub-part.

6. A scaleable video system according to claim 4 wherein said control means asynchronously receives external requests to stop sending said same video stream to a number of viewers; and where said control means satisfies said requests when said one counter is decremented to zero by subtracting said number from said counter for said corresponding second sub-part.

7. A scaleable video system according to claim 4 wherein said control means responds when said one counter which is decremented reaches zero by replacing said first sub-part of said one duplicated video stream portion with another sub-part that immediately follows said second sub-part.

8. A scaleable video system according to claim 1 wherein a group of at least two of said co-processors send the same video stream to respective sets of viewers, and where said data storage means stores a single portion of said same video stream for all of the co-processors in said group and divides that single stored portion into first, second, and third consecutive sub-parts.

9. A scaleable video system according to claim 8 wherein said control means includes a separate counter for each sub-part which determines the total number of viewers for the corresponding sub-part.

10. A scaleable video system according to claim 9 wherein each time a viewer has been sent one sub-part in its entirety, said control means decrements the counter for that sub-part and increments the counter for the next consecutive sub-part.

11. A scaleable video system according to claim 10 wherein said control means asynchronously receives external requests to have said same video stream be sent to a number of new viewers; and where said control means satisfies said requests when the counter for said first sub-part is decremented to zero by adding said number to the counter for said third sub-part.

12. A scaleable video system according to claim 10 wherein said control means asynchronously receives external requests to stop sending said same video stream to a number of viewers; and where said control means satisfies said requests when the counter for said first sub-part is decremented to zero by subtracting said number from the counter for said third sub-part.

13. A scaleable video system according to claim 10 wherein said control means responds when the counter for said first sub-part is decremented to zero by replacing said first sub-part with another sub-part that immediately follows said third sub-part.

14. A scaleable video system according to claim 1 wherein a group of at least two of said co-processors send the same video stream to respective sets of viewers, where said data storage means stores a single portion of said same video stream for all of the co-processors in said group, and where said system includes a synchronizing means which directs each co-processor in said group to read said single stored portion of said same video stream from said data storage means within a time period which is the same for every co-processor in said group.

15. A scaleable video system according to claim 14 wherein said control means divides said single stored portion of said same video stream into first and second consecutive sub-parts and includes a separate counter for each sub-part which determines the total number of viewers for the corresponding sub-part.

16. A scaleable video system according to claim 15 wherein each time a viewer has been sent one sub-part in its entirety, said control means decrements the one counter for that sub-part and increments the counter for the next consecutive sub-part.

17. A scaleable video system according to claim 16 wherein said control means asynchronously receives external requests to have said same video stream be sent to a number of new viewers; and where said control means satisfies said requests when said one counter is decremented to zero by adding said number to the counter for the next consecutive sub-part.

18. A scaleable video system according to claim 16 wherein said control means asynchronously receives external requests to stop sending said same video stream to a number of viewers; and where said control means satisfies said requests when said one counter is decremented to zero by subtracting said number from the counter for the next consecutive sub-part.

19. A scaleable video system according to claim 16 wherein said control means responds when the counter for said first sub-part is decremented to zero by replacing said first sub-part with another sub-part that immediately follows said second sub-part.

* * * * *